United States Patent
Lin et al.

(10) Patent No.: US 11,360,372 B2
(45) Date of Patent: Jun. 14, 2022

(54) PROJECTOR

(71) Applicant: QISDA CORPORATION, Taoyuan (TW)

(72) Inventors: Wen-Yao Lin, Taoyuan (TW); Ching-Shuai Huang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/831,755

(22) Filed: Mar. 26, 2020

(65) Prior Publication Data

US 2020/0333696 A1 Oct. 22, 2020

(30) Foreign Application Priority Data

Apr. 22, 2019 (CN) .......................... 201910324508.X

(51) Int. Cl.
*G03B 21/20* (2006.01)
*G02B 27/14* (2006.01)
*G02B 27/30* (2006.01)
*H04N 9/31* (2006.01)

(52) U.S. Cl.
CPC ......... *G03B 21/204* (2013.01); *G02B 27/141* (2013.01); *G02B 27/30* (2013.01); *G03B 21/2013* (2013.01); *G03B 21/2066* (2013.01); *H04N 9/3158* (2013.01)

(58) Field of Classification Search
CPC ............ G03B 21/00–64; G02B 26/008; G02B 27/141; G02B 27/142; H04N 9/31–3197
See application file for complete search history.

(56) References Cited

U.S. PATENT DOCUMENTS

| 2012/0147332 A1* | 6/2012 | Huang | ............... G03B 21/2013 |
| | | | 353/31 |
| 2017/0175989 A1* | 6/2017 | Yamagishi | ................ F21V 9/30 |
| 2018/0299757 A1* | 10/2018 | Liao | ....................... G03B 33/08 |

FOREIGN PATENT DOCUMENTS

| CN | 102789121 A | 11/2012 |
| CN | 108761981 A | 11/2018 |

* cited by examiner

*Primary Examiner* — Michelle M Iacoletti
*Assistant Examiner* — Christopher A Lamb, II

(57) ABSTRACT

A projector includes a first light source, a second light source, a collimating lens, a wavelength conversion module and a dichroic mirror. The first light source and the second light source respectively emit a first illumination beam and a second illumination beam. The collimating lens includes a first part and a second part and configured to receive and transmit the first illumination beam. The wavelength conversion module receives the first illumination beam from the first part, and generates an excitation beam transmitted toward the first part and the second part. The dichroic mirror corresponds to the first part, and configured to reflect the first illumination beam and the second illumination beam respectively to different directions for projecting the first illumination beam onto the first part and to be passed by the excitation beam.

6 Claims, 7 Drawing Sheets

PROJECTOR

BACKGROUND OF THE INVENTION

1. Field of the Invention

The present invention relates to a projector, and more particularly, to a projector having advantages of a less number of components, small volume and low manufacturing cost.

2. Description of the Prior Art

The conventional laser projector utilizes the blue light laser source to provide the illumination beam. The illumination beam is transformed into an excitation beam with different color via a wavelength conversion device (such as the color wheel partly covered by phosphor powder or quantum dot material); then, the excitation beam can be mixed with the illumination beam for related application. The conventional alignment module utilizes the dichroic component to reflect the illumination beam toward the color wheel. A portion of the color wheel made by wavelength conversion material generates the excitation beam accordingly, and the excitation beam can directly pass through the dichroic component. Besides, a part of the illumination beam passes through another portion of the color wheel without wavelength conversion function and moves back the dichroic component via reflecting components, and then is reflected by the dichroic component to mix with the excitation beam. The conventional alignment module has drawbacks of expensive hardware cost and heavy weight due to a large number of optical components.

SUMMARY OF THE INVENTION

The present invention provides a projector having advantages of a less number of components, small volume and low manufacturing cost for solving above drawbacks.

According to the claimed invention, a projector includes a first light source, a second light source, a collimating lens, a wavelength conversion module and a dichroic mirror. The first light source is adapted to emit a first illumination beam. The second light source is adapted to emit a second illumination beam. A wavelength of the second illumination beam is different from a wavelength of the first illumination beam. The collimating lens is adapted to receive and transmit the first illumination beam, and the collimating lens has a first part and a second part. The wavelength conversion module is adapted to receive the first illumination beam from the first part, and generate an excitation beam transmitted toward the first part and the second part. The dichroic mirror is disposed between the first light source and the second light source, and a position of the dichroic mirror corresponds to the first part. The dichroic mirror is adapted to respectively reflect the first illumination beam and the second illumination beam toward different direction, so that the first illumination beam is projected onto the first part and the excitation beam is allowed to pass through the dichroic mirror.

According to the claimed invention, the dichroic mirror may include a reflective coating layer disposed on surface of the dichroic mirror facing the first light source and adapted to reflect the first illumination beam and the second illumination beam. Further, the dichroic mirror may include a reflective coating layer disposed on surface of the dichroic mirror facing the second light source and adapted to reflect the first illumination beam and the second illumination beam. Further, the dichroic mirror may include a first reflective coating layer and a second reflective coating layer respectively disposed on a first surface of the dichroic mirror facing the first light source and a second surface of the dichroic mirror facing the second light source. The first reflective coating layer is used to reflect the first illumination beam, and the second reflective coating layer is used to reflect the second illumination beam.

According to the claimed invention, the first illumination beam is a blue beam, the second illumination beam is a red beam, the dichroic mirror is used to reflect the blue beam and the red beam and allowed to be passed by a beam with other color, and the excitation beam is a yellow beam.

The projector of the present invention can utilize the wavelength conversion module to reflect the illumination beam and generate the excitation beam partially, and the wavelength conversion module can be matched with the dichroic mirror, which corresponds to the first part of the collimating lens, to structure the alignment module having a minimal number of components within limited space for mixing the beams. The first illumination beam provided by the first light source can be functioned by the dichroic mirror and the wavelength conversion module to generate the excitation beam, and the excitation beam may loss the energy in some waveband; therefore, the present invention can provide the second illumination beam from the second light source to resupply the energy in the weak waveband. The dichroic mirror can have functions of reflecting the first illumination beam and the second illumination beam and further being passed by the excitation beam. Position of the reflective coating layer on the dichroic mirror is not limited to the foresaid embodiments, which can be changed in accordance with arrangement of the light source, the wavelength conversion module and the optical guiding component of the projector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
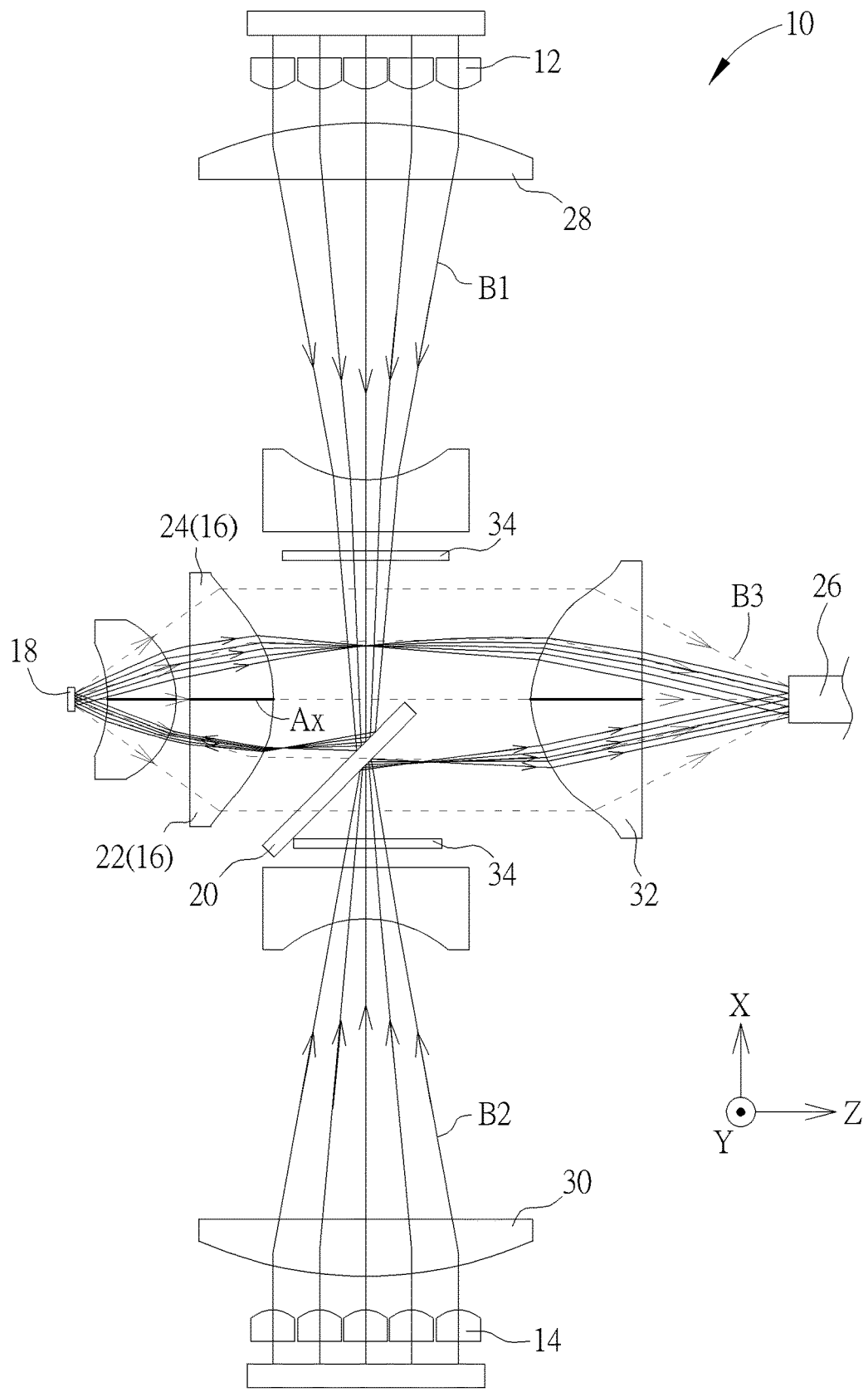
FIG. 1 is a diagram of a projector according to an embodiment of the present invention.
Figure 2:
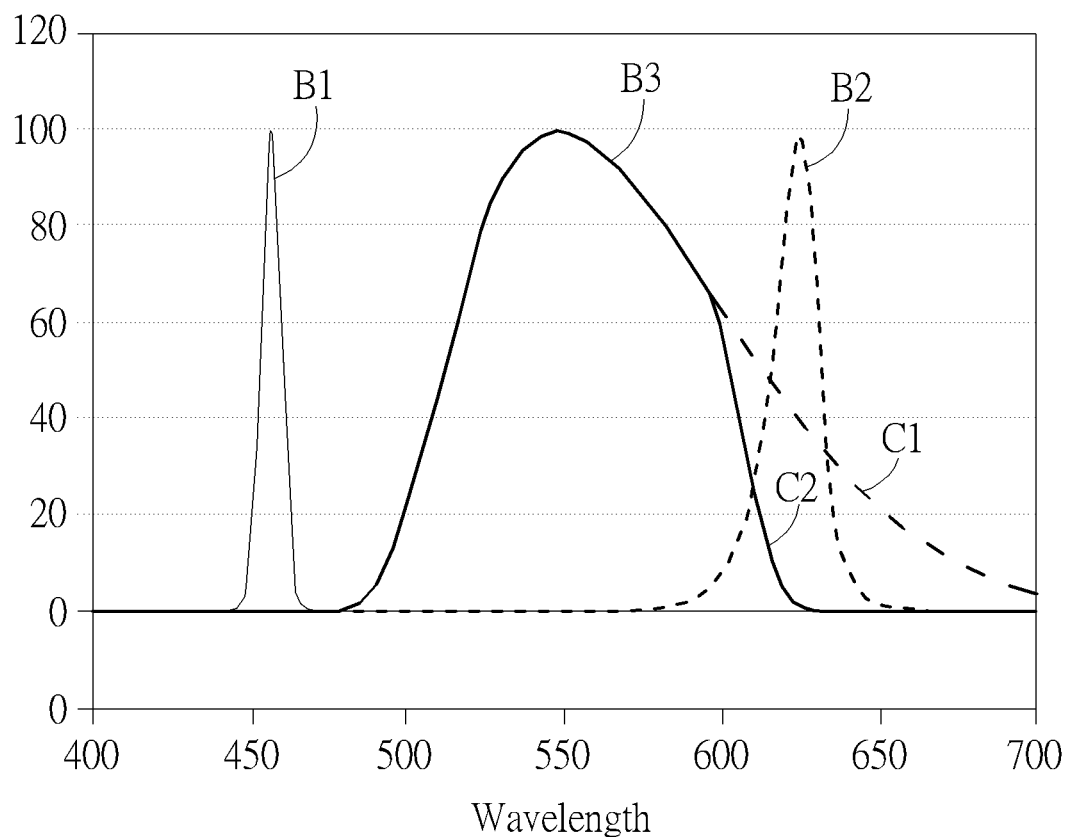
FIG. 2 is a diagram of an alignment spectrum generated by the projector according to the embodiment of the present invention.

Please refer to FIG. 1 and FIG. 2. FIG. 1 is a diagram of a projector 10 according to an embodiment of the present invention. FIG. 2 is a diagram of an alignment spectrum generated by the projector 10 according to the embodiment of the present invention. An alignment module of the projector 10 can include a first light source 12, a second light source 14, a collimating lens 16, a wavelength conversion module 18 and a dichroic mirror 20. The first light source 12 and the second light source 14 can be respectively disposed on two opposite sides of the dichroic mirror 20. The first light source 12 can emit a first illumination beam B1 in the −X direction, and the second light source 14 can emit a second illumination beam B2 in the +X direction. The first illumination beam B1 provided by the first light source 12 can have a wavelength different from a wavelength of the second illumination beam B2 provided by the second light source 14. The collimating lens 16 can have a first part 22 and a second part 24, which are separated by a central axle Ax of the collimating lens 16.

A position of the dichroic mirror 20 can correspond to the first part 22 of the collimating lens 16. The dichroic mirror 20 can reflect the first illumination beam B1 in the −Z direction, and the first illumination beam B1 can pass through the first part 22 of the collimating lens 16 to be projected onto the wavelength conversion module 18. The wavelength conversion module 18 can directly reflect the first illumination beam B1 toward the second part 24 of the collimating lens 16, and the first illumination beam B1 can be transmitted in the +Z direction. The wavelength conversion module 18 further can absorb the first illumination beam B1 and then generate an excitation beam B3. The excitation beam B3 can be projected onto the first part 22 and the second part 24 of the collimating lens 16, and be transmitted in the +Z direction. The excitation beam B3 may be partially filtered when passing through the dichroic mirror 20 via the first part 22, so that the dichroic mirror 20 can further reflect the second illumination beam B2 toward the +Z direction, and a receiving end of the alignment module can acquire the first illumination beam B1 from the second part 24, the second illumination beam B2 from the dichroic mirror 20, and the excitation beam B3 from the first part 22 and the second part 24.

The alignment module of the projector 10 further can include an optical guiding component 26, a first condensing lens 28, a second condensing lens 30, a third condensing lens 32 and a diffusing component 34. The optical guiding component 26 can be the receiving end of the alignment module, and used to receive the first illumination beam B1 from the second part 24, the second illumination beam B2 from the dichroic mirror 20, and the excitation beam B3 from the collimating lens 16. The first condensing lens 28 can be disposed between the first light source 12 and the dichroic mirror 20, and used to condense the first illumination beam B1 transmitted toward the dichroic mirror 20. The second condensing lens 30 can be disposed between the second light source 14 and the dichroic mirror 20, and used to condense the second illumination beam B2 transmitted toward the dichroic mirror 20. The third condensing lens 32 can be disposed between the dichroic mirror 20 and the optical guiding component 26, and used to condense the first illumination beam B1, the second illumination beam B2 and the excitation beam B3 transmitted toward the optical guiding component 26. The diffusing components 34 can be disposed between the first light source 12 and the dichroic mirror 20, and further between the second light source 14 and the dichroic mirror 20. The first illumination beam B1 and the second illumination beam B2 can be diffused via the diffusing component 34.

The excitation beam B3 may loss energy in some waveband when passing the dichroic mirror 20, and the beam received by the optical guiding component 26 has weak energy in the foresaid waveband. For example, a dotted curve C1 can represent variation in a wavelength and a penetration rate of the excitation beam B3 before passing through the dichroic mirror 20, and a solid curve C2 can represent variation in the wavelength and the penetration rate of the excitation beam B3 after passing through the dichroic mirror 20. For increasing the energy in the foresaid waveband of the beam received by the optical guiding component 26, the present invention can utilize the second light source 14 to emit the second illumination beam B2, and the alignment spectrum mixed with the first illumination beam B1, the second illumination beam B2 and the excitation beam B3 can be shown in FIG. 2. In this embodiment, the first illumination beam B1 can be the blue beam (having the wavelength ranged between 450~495 nm), and the second illumination beam B2 can be the red beam (having the wavelength ranged between 580~640 nm). The excitation beam B3 can be the yellow beam (having the wavelength ranged between 570~590 nm) before passing through the dichroic mirror 20, and can be transformed into the green beam because of passing through the dichroic mirror 20 and losing some energy in the red-light waveband.

Figure 3:
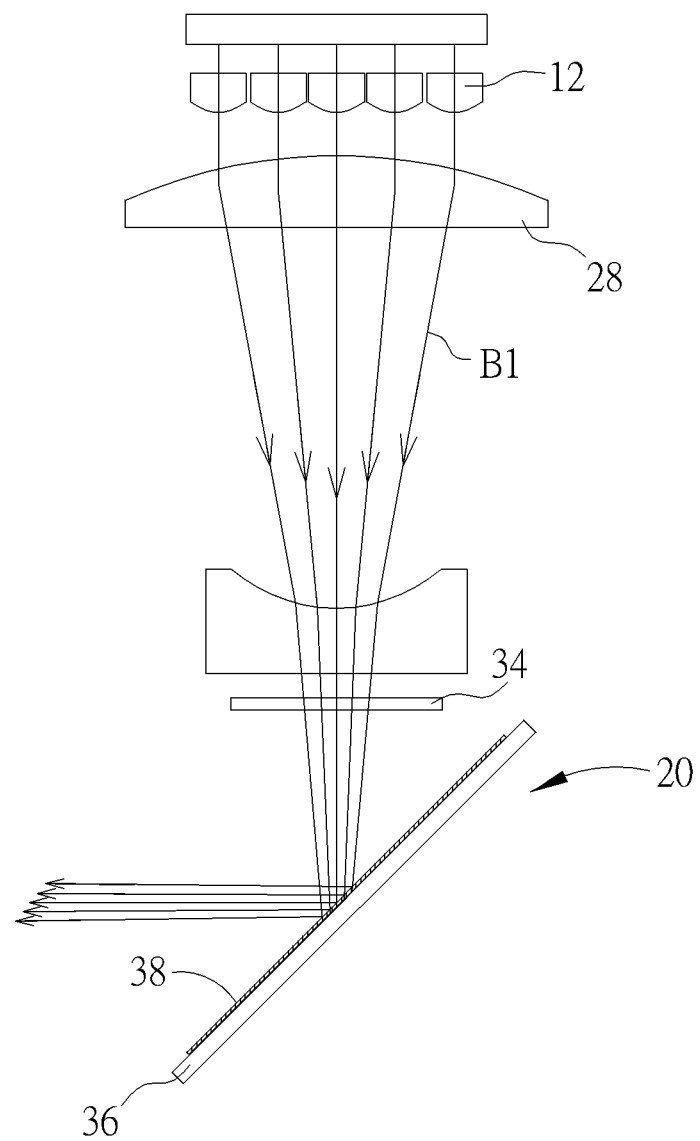
FIG. 3 to FIG. 5 are diagrams of a dichroic mirror according to different embodiments of the present invention.
Figure 4:
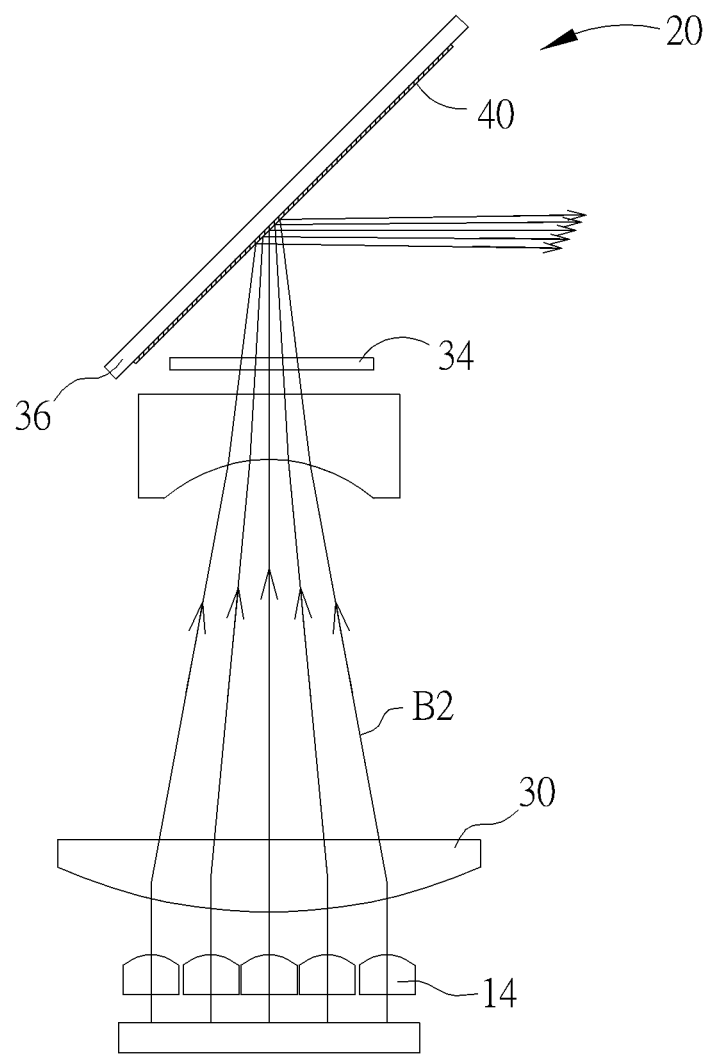
Figure 5:
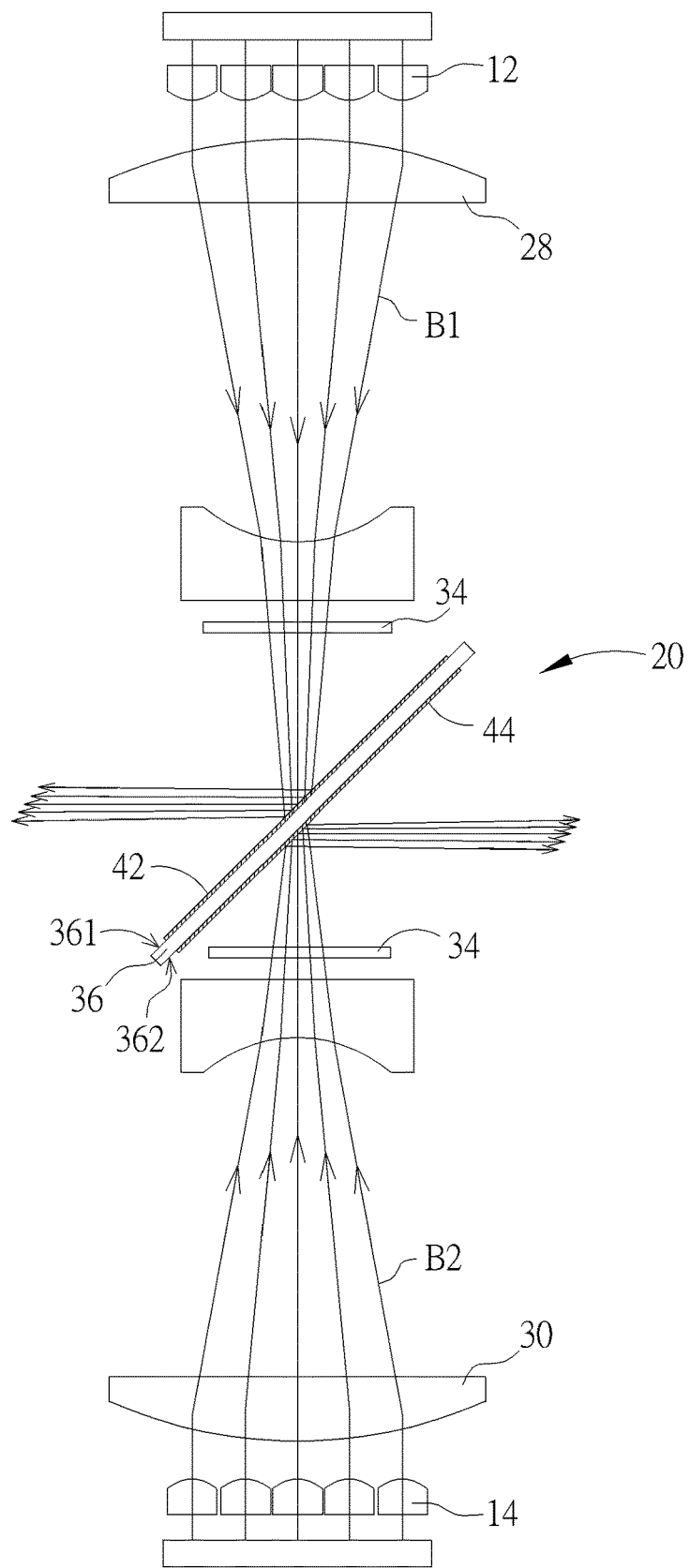

Please refer to FIG. 3 to FIG. 5. FIG. 3 to FIG. 5 are diagrams of the dichroic mirror 20 according to different embodiments of the present invention. Design of the dichroic mirror 20 is not limited to the following embodiments, which depends on an actual demand. As the embodiment shown in FIG. 3, the dichroic mirror 20 can include a substrate 36 and a reflective coating layer 38. The reflective coating layer 38 can be disposed on a surface of the substrate 36 facing the first light source 12. The reflective coating layer 38 can reflect the first illumination beam B1 (the blue beam) and the second illumination beam B2 (the red beam), and can be passed by the excitation beam B3 (the yellow beam). As the embodiment shown in FIG. 4, the dichroic mirror 20 can include the substrate 36 and a reflective coating layer 40, and the reflective coating layer 40 can be disposed on a surface of the substrate 36 facing the second light source 14. The reflective coating layer 40 can reflect the first illumination beam B1 (the blue beam) and the second illumination beam B2 (the red beam), and can be passed by the excitation beam B3 (the yellow beam). As the embodiment shown in FIG. 5, the dichroic mirror 20 can include the substrate 36, a first reflective coating layer 42 and a second reflective coating layer 44. The first reflective coating layer 42 can be disposed on a first surface 361 of the substrate 36 facing the first light source 12, and adapted to reflect the first illumination beam B1. The second reflective coating layer 44 can be disposed on a second surface 362 of the substrate 36 facing the second light source 14, and adapted to reflect the second illumination beam B2.

Figure 6:
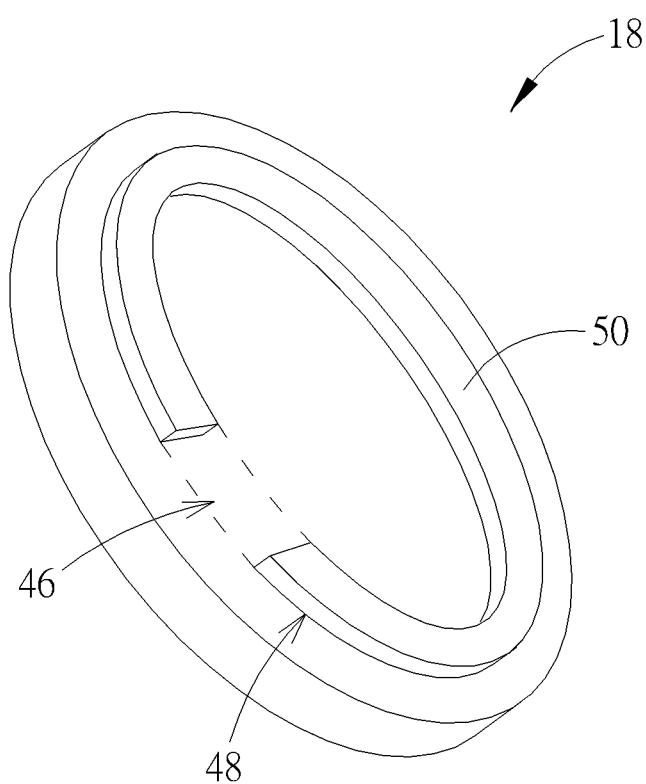
FIG. 6 is a diagram of a wavelength conversion module according to the embodiment of the present invention.

Please refer to FIG. 6. FIG. 6 is a diagram of the wavelength conversion module 18 according to the embodiment of the present invention. The wavelength conversion module 18 can have a first region 46 and a second region 48. The first region 46 is made by ordinary reflection material which is used to directly reflect the first illumination beam B1. The second region 48 can have a wavelength coating layer 50. The wavelength coating layer 50 can be phosphor powder or quantum dot material, which used to absorb the first illumination beam B1 for generating the excitation beam B3. The wavelength conversion module 18 can be a rotatable wheel made by disk-typed reflection material, such as an aluminum disk. The second region 48 can a C-typed annular range on the disk-typed reflection material, and the first region 46 can be a breach of the C-typed annular range. The first illumination beam B1 and the excitation beam B3 can be alternately transmitted to the collimating lens 16 in response to rotation of the wavelength conversion module 18.

Figure 7:
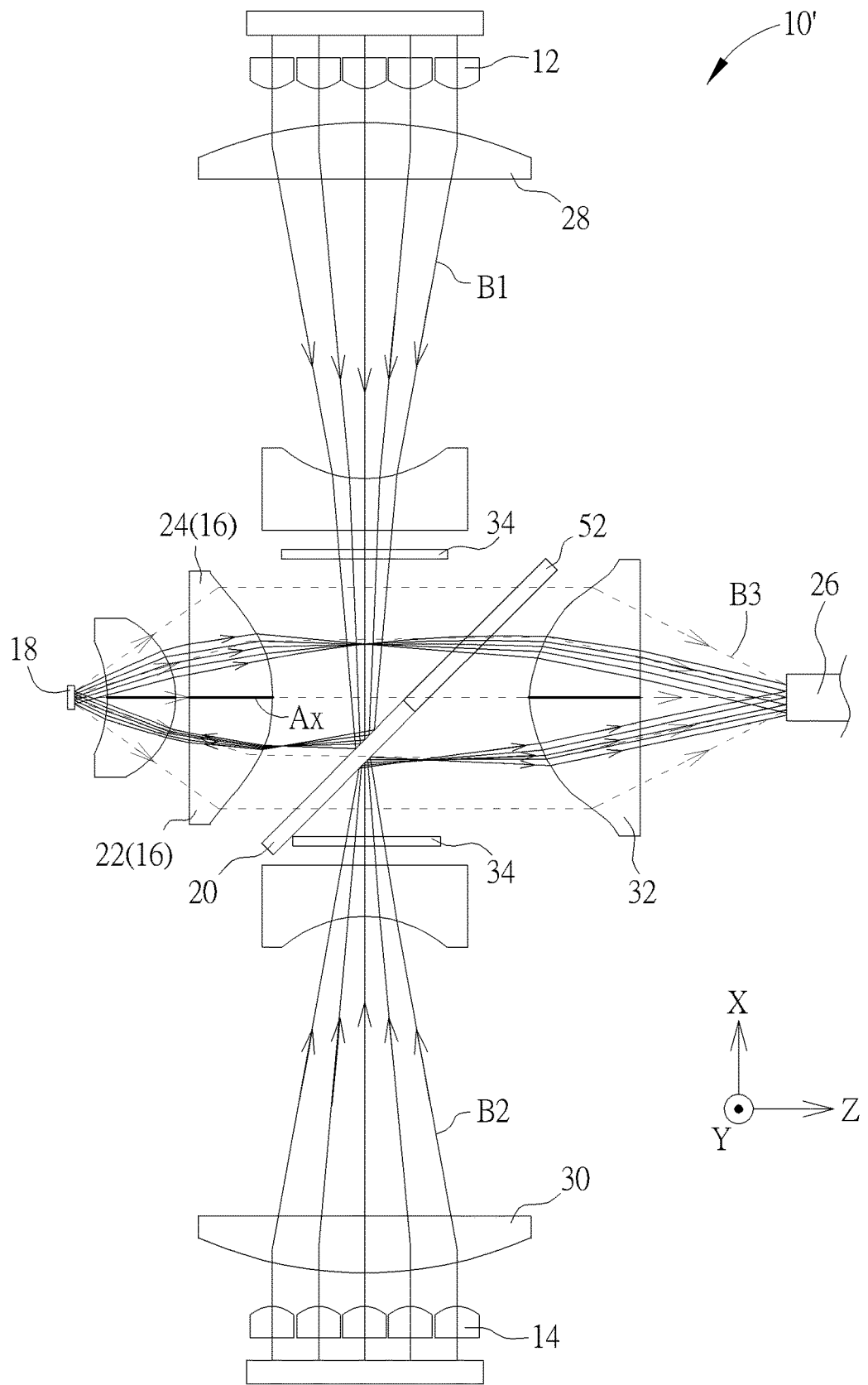
FIG. 7 is a diagram of the projector according to another embodiment of the present invention.

Please refer to FIG. 7. FIG. 7 is a diagram of the projector 10' according to another embodiment of the present invention. In this embodiment, elements having the same numerals as ones of the foresaid embodiment have the same structures and functions, and a detailed description is omitted herein for simplicity. Difference between the projector 10' and the foresaid embodiment is: the projector 10' can dispose an optical penetrating component 52 connected to a side of the dichroic mirror 20. A position of the optical penetrating component 52 can correspond to the second part 24 of the collimating lens 16. The dichroic mirror 20 can reflect the first illumination beam B1, and the first illumination beam B1 can pass through the first part 22 of the collimating lens 16 for projecting onto the wavelength conversion module 18. The wavelength conversion module 18 can reflect the first illumination beam B1, and the first illumination beam B1 can pass through the second part 24 of the collimating lens 16, the optical penetrating component 52 and the first condensing lens 32 in sequence. The excitation beam B3 generated by the wavelength conversion module 18 can pass through the collimating lens 16 (including the first part 22 and the second part 24), a combination of the optical penetrating component 52 and the dichroic mirror 20, and the first condensing lens 32 in sequence, so as to condense and mix with the first illumination beam B1 and the second illumination beam B2.

In conclusion, the projector of the present invention can utilize the wavelength conversion module to reflect the illumination beam and generate the excitation beam partially, and the wavelength conversion module can be matched with the dichroic mirror, which corresponds to the first part of the collimating lens, to structure the alignment module having a minimal number of components within limited space for mixing the beams. The first illumination beam provided by the first light source can be functioned by the dichroic mirror and the wavelength conversion module to generate the excitation beam, and the excitation beam may loss the energy in some waveband; therefore, the present invention can provide the second illumination beam from the second light source to resupply the energy in the weak waveband. The dichroic mirror can have functions of reflecting the first illumination beam and the second illumination beam and further being passed by the excitation beam. Position of the reflective coating layer on the dichroic mirror is not limited to the foresaid embodiments, which can be changed in accordance with arrangement of the light source, the wavelength conversion module and the optical guiding component of the projector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
   a first light source adapted to emit a first illumination beam;
   a second light source adapted to emit a second illumination beam, a wavelength of the second illumination beam being different from a wavelength of the first illumination beam;
   a collimating lens adapted to receive and transmit the first illumination beam, the collimating lens having a first part and a second part and a central axle located between the first part and the second part;
   a wavelength conversion module adapted to receive the first illumination beam from the first part, and generate an excitation beam transmitted toward the first part and the second part; and
   a dichroic mirror disposed between the first light source and the second light source, the dichroic mirror being isolated on one side of the central axle and a position of the dichroic mirror corresponding to the first part, the dichroic mirror being adapted to respectively reflect the first illumination beam and the second illumination beam toward different directions, so that the first illumination beam is projected onto the first part and the excitation beam is allowed to pass through the dichroic mirror;
   wherein the dichroic mirror comprises a reflective coating layer disposed on a surface of the dichroic mirror facing the first light source and adapted to reflect the first illumination beam toward the collimating lens and further reflect the second illumination beam toward an optical guiding component, being a light pipe or a light rod.

2. The projector of claim 1, wherein the first illumination beam is a blue beam, the second illumination beam is a red beam, the dichroic mirror is used to reflect the blue beam and the red beam and allowed to be passed by a beam with other color, and the excitation beam is a yellow beam.

3. The projector of claim 1, further comprising:
   an optical penetrating glass connected to the dichroic mirror, a position of the optical penetrating glass corresponding to the second part, the first illumination beam and the excitation beam passing through the optical penetrating glass.

4. The projector of claim 1, wherein the wavelength conversion module is rotatable and has a first region and a second region, the first region reflects the first illumination beam from the first part to the second part, the second region comprises a wavelength coating layer adapted to receive the first illumination beam to generate the excitation beam.

5. The projector of claim 1, further comprising:
   the optical guiding component adapted to receive the excitation beam from the first part and the second part, the first illumination beam from the second part, and the second illumination beam from the dichroic mirror.

6. The projector of claim 5, further comprising:
   a first condensing lens disposed between the first light source and the dichroic mirror for condensing the first illumination beam transmitted toward the dichroic mirror;
   a second condensing lens disposed between the second light source and the dichroic mirror for condensing the second illumination beam transmitted toward the dichroic mirror;
   a third condensing lens disposed between the dichroic mirror and the optical guiding component for condensing the first illumination beam, the second illumination beam and the excitation beam; and
   a diffuser disposed between the first light source and the dichroic mirror for diffusing the first illumination beam.

* * * * *